United States Patent [19]

Lin et al.

[11] Patent Number: 5,036,313

[45] Date of Patent: Jul. 30, 1991

[54] PORTABLE COMPUTER WITH IMPROVED ASSEMBLY DESIGN

[75] Inventors: Frank W. Lin, Los Altos; Harvey C. Wong, Fremont; Sam K. Lim, San Jose, all of Calif.

[73] Assignee: Micronics Computers, Inc., Fremont, Calif.

[21] Appl. No.: 398,793

[22] Filed: Aug. 25, 1989

[51] Int. Cl.⁵ ............................................. G09G 5/00
[52] U.S. Cl. .................................. 340/700; 361/395; 361/413; 361/415; 364/708
[58] Field of Search ....................... 340/700, 711, 720; 361/380, 392–396, 399, 413, 415; 364/708; 312/208, 223, 330.1, 294, 333, 350; 248/917, 918

[56] References Cited

U.S. PATENT DOCUMENTS

| | | | |
|---|---|---|---|
| 4,742,478 | 5/1988 | Nigro, Jr. et al. | 364/708 |
| 4,758,928 | 7/1988 | Wierec et al. | 361/415 |
| 4,918,572 | 4/1990 | Tarver et al. | 361/395 |
| 4,979,075 | 12/1990 | Murphy | 361/399 |

Primary Examiner—Jeffery A. Brier
Attorney, Agent, or Firm—Townsend & Townsend; Townsend & Townsend

[57] ABSTRACT

An improved assembly design for a portable computer. A housing has a base member with a plurality of edge guides located along the side portions and a plurality of connector sockets arranged along the inner front portion. A matching circuit board has a plurality of forwardly extending plug margins which mate with the sockets when the board is fully installed in the edge guides. The board carries the main computer system electronic components and a rigid disk memory module. The keyboard assembly, floppy disk memory and power supply are all mounted to the under surface of the housing cover member, and the display panel is mounted to the top of the cover. The design enables quick assembly of the computer, and quick removal of the circuit board for repair.

10 Claims, 3 Drawing Sheets

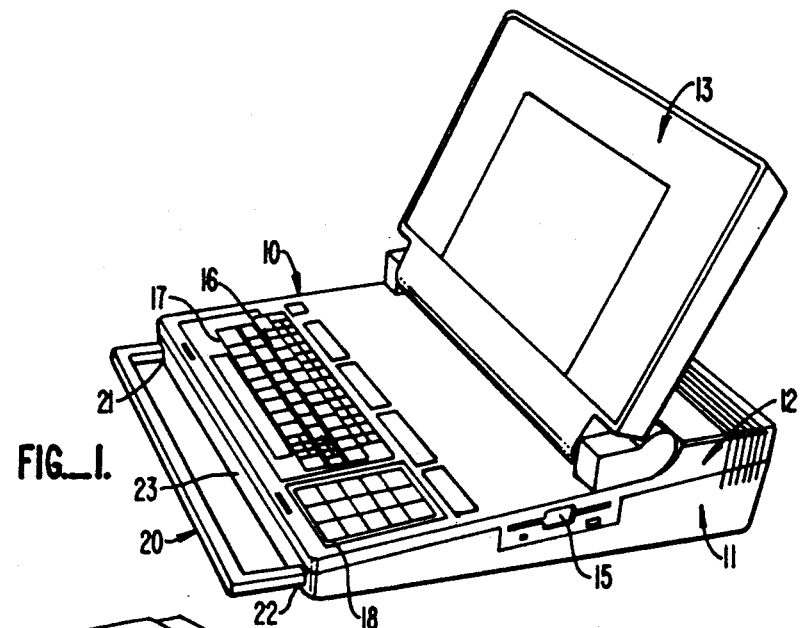
FIG._1.
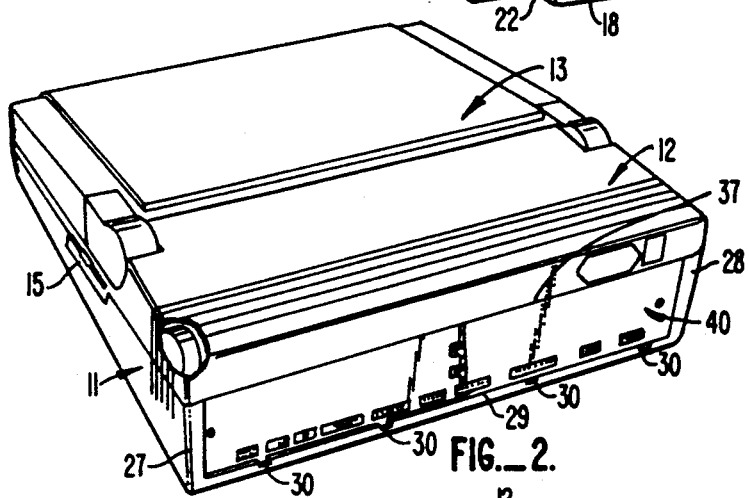
FIG._2.
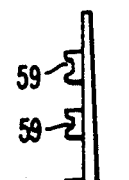
FIG._4.
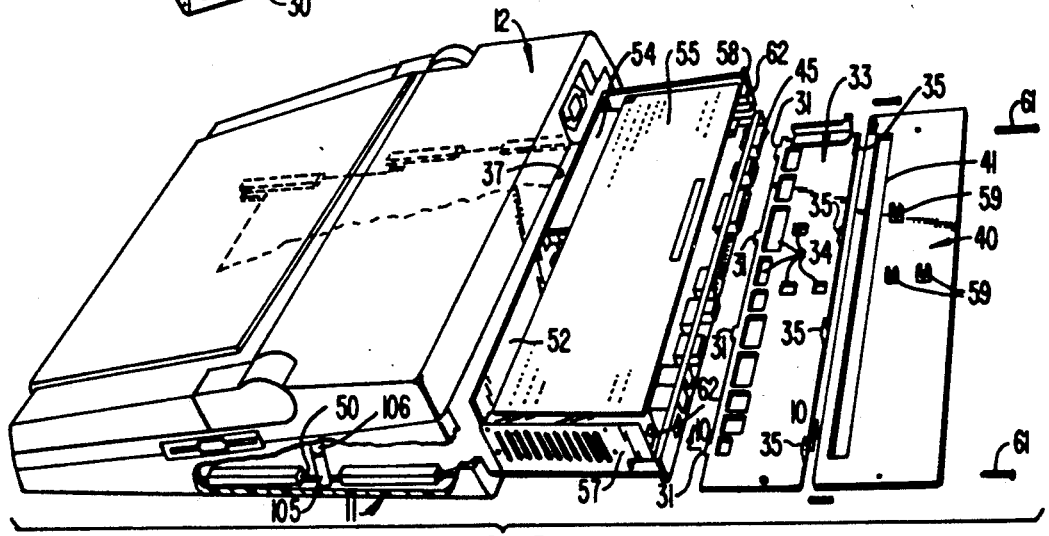
FIG._3.

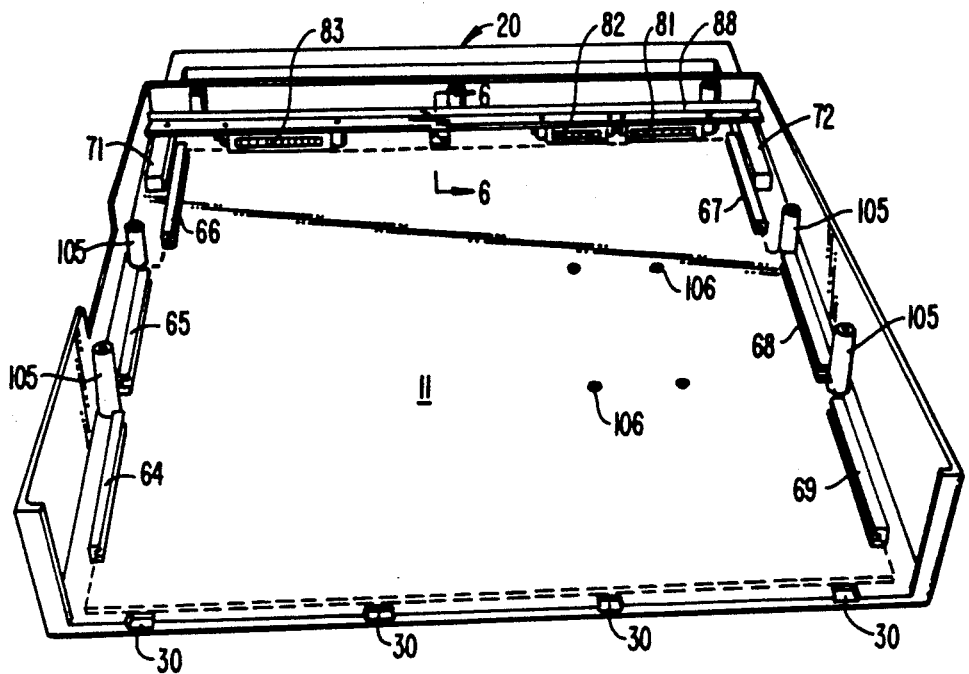
FIG._5.
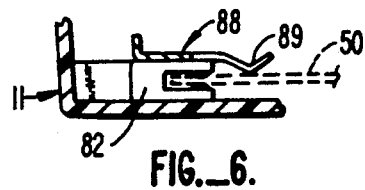
FIG._6.
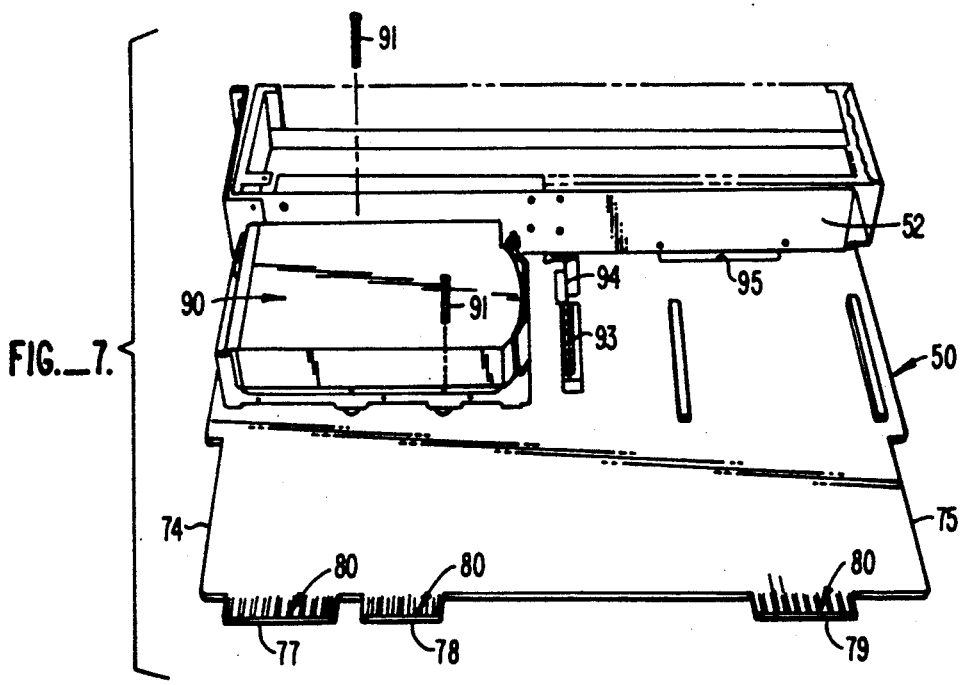
FIG._7.

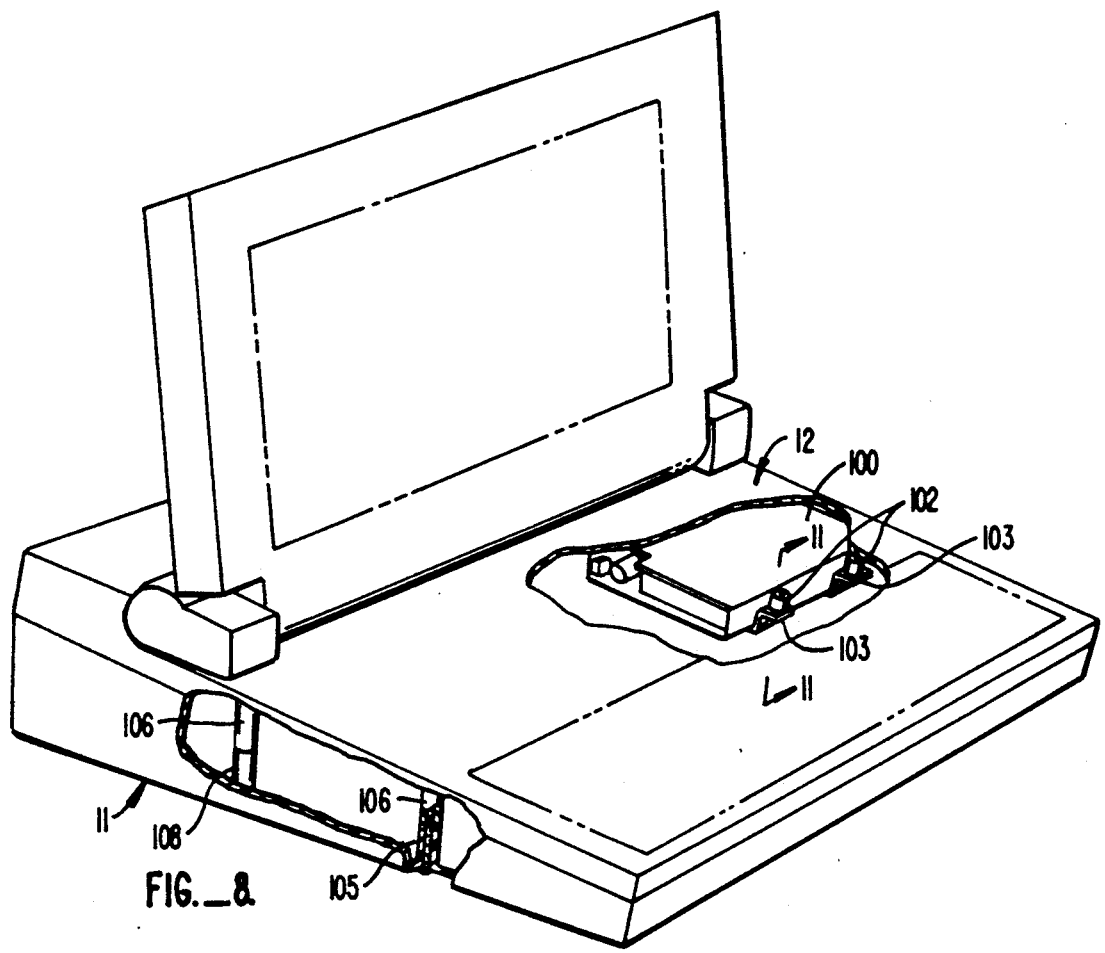
FIG._8.
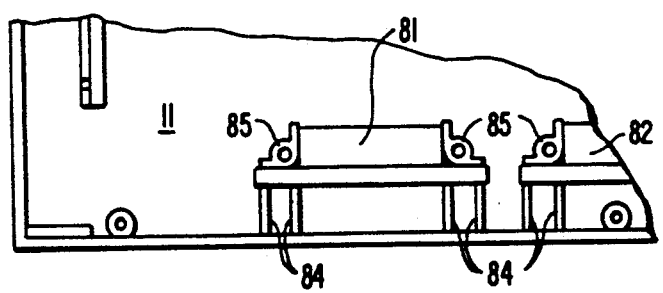
FIG._9.
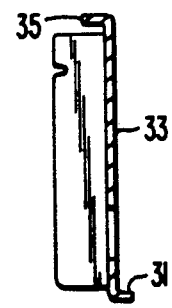
FIG._10.
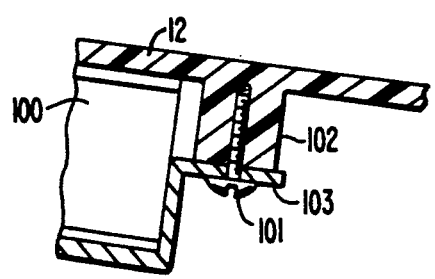
FIG._11.

PORTABLE COMPUTER WITH IMPROVED ASSEMBLY DESIGN

BACKGROUND OF THE INVENTION

This invention relates to portable computers of limited physical size and weight.

Portable computers are known which typically incorporate into a single cabinet of portable size the entire set of functional components of a computer, i.e., a keyboard, a display panel, a disk memory module, interface connectors for communication with external devices, and the electronic circuit components necessary to provide the computing capability, including a power supply. One of the major criteria in the design of portable computers is the physical size: specifically, the size should be small enough so that the computer is truly portable.

While several portable computer designs have been successfully produced, a major disadvantage in general with existing designs lies in the difficulty in assembling, testing and repairing the system. In particular, given the relative complexity in both the mechanical and electrical sense of a fully functioning computer system, an extraordinary number of mechanical and electrical components must be efficiently packaged into a volume of space which is relatively small given the number of components required. Existing designs typically require extensive and time consuming assembly operations in order to carefully assemble the various components together into the housing. Also, existing designs further require that the electrical and mechanical components be assembled together into an at least semi-finished state before the entire computer system can be tested for proper operation. Also, once assembled, with existing designs it is exceedingly difficult to disassemble the electrical and mechanical components in order to repair a malfunctioning computer system.

SUMMARY OF THE INVENTION

The invention comprises a portable computer which is relatively inexpensive to assemble, which can be tested prior to final assembly and which can be readily disassembled for subsequent trouble shooting and repair.

A housing comprising a base member and a cover member is provided with a display panel pivotally attached to the upper rearward portion. The base member includes a central support surface, a pair of laterally spaced side portions having upwardly extending walls, a front portion and a rear portion. The cover member includes front, rear and laterally spaced edge portions dimensioned and arranged to mate with the upper margins of the base member.

A plurality of connector sockets are secured to the base member support surface adjacent the front portion thereof and enable electrical coupling between circuit components mounted on a circuit board member and discrete modular components of the computer system, including the display panel, the keyboard and a floppy disk drive module.

The circuit board member includes a central support surface having the electrical components mounted thereon, and front, rear and laterally spaced edge portions. The front portion of the circuit board member includes a plurality of outwardly extending plug margins each dimensioned to be received in an associated one of the plurality of connector sockets mounted to the base member so that corresponding ones of the electrical components on the circuit board member are electrically coupled to the associated socket.

A plurality of support members are carried by the side portions of the base member for slidably receiving the edge portions of the circuit board member and providing support therefor.

A first disk memory module housing a rigid disk is secured to the support surface of the circuit board member and is electrically coupled to the board member components by means of a board mounted connector socket. A second disk memory module for accommodating a floppy disk is secured to the lower surface of the covered member and is electrically coupled to one of the plurality of connector sockets. A keyboard secured to the lower surface of the cover member at a position forwardly of the first and second disk memory modules is electrically coupled to a second one of the connector sockets.

A combination stiffening device, socket retaining member and circuit board retaining member is transversely arranged across the front portion of the base member. This member has a centrally located biasing tongue for providing a downward force on the front portion of the circuit board member when installed. The stiffening member is positioned above the plurality of socket connectors in contact therewith and functions in cooperation with a plurality of ribs and keepers extending upwardly from the base member support surface to maintain the connector sockets mechanically secured in place.

The circuit board member is provided with a vertical partition mounted transversely thereof and rearwardly of the first disk memory module, and at least one additional socket member is carried by the vertical partition in order to receive the male connector portion of an expansion circuit board, when installed. A retaining panel is removably secured to the rear portion of the base member, the retaining panel having at least one forwardly extending biasing nib, which is preferably notched and arranged to engage the rear edge of the expansion circuit board when installed in the additional socket member. A connector panel is secured adjacent the rear portion of the circuit board member, and a plurality of connectors are secured to the connector panel in order to provide appropriate connections to external devices such as printers, modems, disk drives and the like. A shield panel is also installed outwardly of the connector panel and inwardly of the retaining panel in order to provide mechanical strength and electromagnetic shielding for the rear portion of the device. The circuit board member contains the various electronic components required to provide a functioning computer system, and also serves as a mounting surface for the first disk memory module. Due to this arrangement, the combination of the computer system and the disk memory module can be tested prior to the assembly of the entire set of components.

To assemble, the second disk memory module, the keyboard assembly and a power supply assembly are secured to the lower surface of the cover member, the display panel is installed on the top of the cover member and the connector sockets are connected to the second disk memory module, the keyboard assembly and the display panel by ribbon cables, after which the cover member is secured to the base member. The circuit board member with the attached disk memory module is installed in the base member of the housing from the rear by progressively engaging the edges of the circuit board member in the support members carried by the side portions of the base member and sliding the circuit board member in the forward direction of the housing until the retaining member tongue engages the top edge of the forward portion of the circuit board member and thereafter until the plug margins are received in the respective connector sockets. Thereafter, the shield panel is installed to the rear of the housing, after which the retaining panel is secured to the rear portion of the device.

To remove the circuit board member, the retaining panel and the shield panel are first removed, after which the circuit board member is simply withdrawn by reversing the installation process.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a perspective view of a preferred embodiment of the invention with the display panel in the open position and the handle extended;

FIG. 2 is a perspective view from the rear of the embodiment of FIG. 1 with the display panel closed and the handle retracted;

FIG. 3 is a perspective view from the rear right side of the preferred embodiment of the invention with the retainer and shield panels removed, the circuit board member partially withdrawn and showing the right wall portion of the base member partially broken away;

FIG. 4 is a detail view illustrating the circuit board retaining nibs on the inner surface of the retaining panel;

FIG. 5 is a rear perspective view showing the base member with the transverse retaining strap installed over the connector sockets and also illustrating the circuit board member edge guides;

FIG. 6 is an enlarged partial sectional view taken along lines 6—6 of FIG. 5 illustrating the retaining strap biasing tongue and one of the connector sockets in section;

FIG. 7 is a front perspective view of the circuit board member with the fixed disk memory module and rear vertical partition installed;

FIG. 8 is a schematic perspective view partially in phantom illustrating the floppy disk memory module attached to the lower surface of the cover member;

FIG. 9 is an enlarged partial view illustrating the keeper members for one of the socket connectors;

FIG. 10 is an enlarged sectional view taken along lines 10—10 of FIG. 3 illustrating the retainer tangs in the panel 33; and FIG. 11 is an enlarged detailed view taken along line 11—11 of FIG. 8 illustrating the manner of mounting components to the lower surface of cover member 2.

DESCRIPTION OF THE PREFERRED EMBODIMENTS

Turning now to the drawings, FIG. 1 illustrates in perspective form a portable computer incorporating the invention. As seen in this FIG., the computer includes a housing generally designated with reference numeral 10 having a base member 11 and a cover member 12. Pivotally attached to the cover member 12 towards the rear portion thereof is a video display panel 13 of conventional construction, such as a plasma display or a liquid crystal display. Since this element is well known to those skilled in the art, further description is deemed unnecessary. Formed into the right side wall of cover member 12 is a conventionally shaped opening 15 for a floppy disk drive described below. A keyboard assembly 16, having key tops extending upwardly through appropriate cover apertures such as apertures 17, 18 for the main keyboard portion and the cursor keyboard portion, is secured to the lower surface of cover member 12 by any suitable means, such as preformed integral downwardly depending bosses of the type described below and associated fasteners. A retractable handle assembly 20 is reciprocably secured in appropriately sized apertures 21, 22 formed in the forward wall portion 23 of base member 11.

As seen in FIG. 2, which illustrates the portable computer of FIG. 1 with the display panel 13 in the closed position, the rear wall portion of housing base member 11 includes an essentially U-shaped opening framed by upstanding leg portions 27, 28 connected along the bottom by rear margin 29 having mounting notches 30. As best shown in FIGS. 3 and 10, mounting notches 30 receive downwardly depending tangs 31 of a metal cover plate 33 having a plurality of openings 34. Arranged along the upper edge of plate 33 are a plurality of inwardly extending tangs 35 arranged to be frictionally engaged with the lower rear edge 37 of cover member 12.

Again with reference to FIGS. 2 and 3, a rear cover plate 40, shown partially broken away in FIG. 2, has a transversely extending cut-out portion 41 allowing access to a plurality of connectors and switches generally designated with reference numeral 45 arranged along the rear edge of a circuit board 50. Connectors/switches 45 are conventional components used to facilitate communication between the computer system incorporated into housing 10 and a plurality of external devices, such as a printer, another computer via a modem, an external disk drive or the like. Since such components are well known to those skilled in the art, further description will not be given.

Arranged transversely of the circuit board 50 towards the rear thereof is a vertical support partition 52 partially visible in FIG. 3 and fully visible in FIG. 7, on which at least one edge connector socket 54 is mounted in a horizontal attitude. Socket 54 is a conventional socket used in computer applications for electrically connected additional printed circuit boards usually termed expansion boards to the main computer system elements. As shown in FIG. 3, such an extra (expansion) board 55 is plugged into socket 54. In order to provide additional mechanical stability to board 55 (in addition to that afforded by socket 54), a pair of card edge guide assemblies 57, 58 is attached to the edge margins of the rear portion of circuit board 50. The card edge guide assemblies 57, 58 incorporate conventional plastic card edge guides known to those skilled in the art and used to slidably support a printed circuit board along the edge thereof. To provide additional mechanical stability to the board 55, cover 40 is provided with forwardly extending notched nibs 59 dimensioned to embrace the rear edge of the board 55 when the cover 40 is installed and secured to the card edge guide assemblies 57, 58 by means of screws 61 threaded into corresponding holes 62 formed in the card edge guide assemblies 57, 58.

As best shown in FIGS. 3, and 5-7, circuit board 50 is secured within the base 11 of housing 10 primarily by means of card edge guides 64-69 which are secured to the base member 11 along the inner side portions thereof. The forward most pair of card edge guides 66, 67 are laterally inset from the remaining guides in order to accommodate the inwardly extending arm portions 71, 72 of handle assembly 20. Correspondingly, the forward portions 74, 75 of the side edges of circuit board 50 are laterally inset in order to mechanically mate with the corresponding card edge guides 66, 67.

Laterally spaced along the forward edge of circuit board 50 are three forwardly extending plug margins 77-79 having conductive connector portions 80 which are sized to physically mate with sockets 81-83 mounted to the forward portion of the base 11 support surface (FIG. 5). Connector sockets 81-83 are of conventional construction, and are retained in place by the combination of parallel ribs 84 (FIG. 9) and keeper bosses 85 formed in the support surface of base member 11, and a keeper bar 88 (FIG. 5) secured to the forward portion of base member 11 above handle arms 71, 72 and in engagement with the top surface of each connector socket 81-83. As best shown in FIG. 6, keeper bar 88 has a generally L-shaped configuration with a central tongue portion 89 extending rearwardly of base member 11 and having a bend designed to provide a slight biasing force downwardly of the forward edge of circuit board 50 when the board is fully inserted into base member 11 and received in the card edge guides 64-69.

Secured to circuit board 50 in a left central position as viewed in FIG. 7 is a rigid disk memory module 90 of conventional construction. Module 90 is secured by means of two diagonally arranged fasteners 91 which are inserted through the appropriate holes in the bottom of board 50 into threaded retainers (not shown) incorporated into module 90. Also secured to circuit board 50 are appropriate connectors, such as connector 93 used to electrically couple module 90 with appropriate circuit components on board 50 (not shown); connector 94 used to provide electrical power from a power supply (not shown) to the various electromechanical and electronic components comprising the computer system; and connector 95 used to couple the expansion card 55 (FIG. 3) to the computer system.

As noted above, plug margins 77-79 mate with connector sockets 81-83; sockets 81-83 are connected by means of suitable ribbon connectors (not illustrated) to the display panel 13 (or an interface card for panel 13), the keyboard assembly 16, and a floppy disk drive module 100 (FIG. 8), respectively.

As best shown in FIGS. 8 and 11, the floppy disk drive module 100 is connected to the cover member 12 by means of suitable fasteners 101 secured in downwardly depending bosses 102 integrally formed with cover member 12, with fasteners 101 being received within intermediate flange pieces 103 secured to the casing of floppy disk drive module 100. Although not illustrated in FIG. 8, keyboard assembly 16 is secured to the lower surface of cover member 12 in a similar fashion, as is power supply assembly located rearwardly of display panel 13.

To assemble the computer system, the keyboard assembly 16, floppy disk drive module 100 and power supply assembly (not illustrated) are secured within cover 12, after which panel 13 is pivotally attached thereto. Handle assembly 20 is then installed into the base member 11, along with card edge guides 64-49; connector sockets 81-83; and keeper bar 88. The keyboard assembly 16, floppy disk drive module 100 and display panel 13 are next electrically connected to the respective socket 81-83 by means conventional of ribbon connectors (not illustrated). Thereafter, cover member 12 is secured to base member 11 by means of threaded fasteners inserted upwardly from the bottom of base member 11 through upwardly extending bosses 105 (FIG. 5) and into threaded portions of mating bosses 106 (FIG. 3) depending downwardly from cover member 12. Thereafter, the circuit board 50 with components assembled thereon is inserted into the cavity within housing 10 through the rear, with the edges of circuit board 50 slidably engaged with edge card guides 64-69. Board 50 is manipulated forwardly until the plug margins 77-79 mate with connector sockets 81-83 and tongue 89, which acts as a mechanical guide during the insertion of the board, is engaged with the top surface of circuit board 50. Thereafter, stiffening shield 33 is installed, after which retainer plate 40 is installed. If desired, circuit board 50 may be secured to the base member 11 by means of a pair of fasteners of suitable construction inserted through mounting apertures 106 (FIG. 5) provided in base member 11 and which register with two spare threaded receptacles normally found in rigid disk module 90. Further constructional details are shown in the package of drawings in this application.

As will now be apparent, the above-described invention affords several advantages in construction, assembly, testing and repair. For example, by mounting the rigid disk module 90 directly to the circuit board 50 (as opposed to one of the housing components), the complete computer system comprising the system components on the circuit board 50 and the drive 90 can be tested prior to installation in the housing with the remaining components. If the drive module 90, or any portion of the core computer system is defective, this fact can be determined prior to the final assembly of the entire computer, unlike known designs which require final assembly before a final test. Also, the individual components secured to the cover member 12, viz., the keyboard assembly 16, display panel 13, floppy disk module 100 and power supply assembly (not illustrated), are all designed to be tested individually prior to installation. Further, after the cover member 12 and base member 11 are assembled, the circuit board 50, which comprises the most complex planar structure of the assembly, can be quickly and easily inserted into the housing 10 due to the edge guide and front socket connector arrangement employed. This arrangement also greatly facilitates repair/replacement of the circuit board 50 since it is only necessary to remove the retainer panel 40 and shield panel 33 (and optionally two fasteners removably attached to the rigid disk module 90) in order to withdraw the circuit board 50.

While the above provides a full and complete description of the preferred embodiments of the invention, various modifications, alternate constructions and equivalents may be employed. Therefore, the above description and illustrations should not be construed as limiting the invention, which is defined by appended claims.

What is claimed is:

1. A portable computer having a plurality of electromechanical modules, said computer comprising:
    a housing having a base member and a cover member, said base member including a support surface, a pair of laterally spaced side portions, a front portion and a rear portion;

at least one socket secured to said support surface adjacent said front portion for enabling electrical coupling to at least one of said electromechanical modules;

a circuit board member including a support surface having electrical components supported thereby and front, rear and laterally spaced edge portions, said front portion including an outwardly extending plug margin dimensioned to be received in said socket;

a pair of support members carried by said side portions of said base member for slidably retaining said edge portion of said circuit board member so that said circuit board member can be inserted into said housing from the rear portion of said housing, slidably supported along the edges thereof by said support members, and wherein the plug margin of said circuit board member can be mated with said socket member to enable said electrical components supported on said circuit board to be coupled to the electromechanical modules.

2. A portable computer comprising:

a housing having a base member and a cover member, said base member including a support surface, a pair of laterally spaced side portions, a front portion and a rear portion, said cover member having a plurality of openings, an upper surface and a lower surface;

a plurality of connector sockets laterally arranged along the front portion of said support surface;

a circuit board member including a support surface having electrical components supported thereby and front, rear and laterally spaced edge portions, said front portion including a plurality of outwardly extending laterally spaced plug margins each dimensioned to be received in an associated one of said plurality of connector sockets so that corresponding ones of said electrical components are electrically coupled to the associated socket;

a plurality of pairs of support members carried by said side portions of said base member for slidably retaining said edge portions of said circuit board member;

a first disk memory module secured to said support surface of said circuit board member;

a second disk memory module secured to the lower surface of said cover member and electrically coupled to one of said plurality of sockets;

a keyboard secured to the lower surface of said cover member forwardly of said first and second disk memory modules and electrically coupled to a second one of said sockets, said keyboard having a plurality of key members extending upwardly through said openings in said cover member to expose said key members for use.

3. The invention of claim 2 wherein said computer further includes a display panel pivotally attached to said cover member.

4. The invention of claim 2 further including retaining means positioned adjacent said front portion of said base member for providing a downwardly directed biasing force to said front portion of said circuit board member.

5. The invention of claim 4 wherein said retaining means including a laterally arranged stiffening member extending transversely of said front portion of said base member and secured adjacent the side portion thereof.

6. The invention of claim 5 wherein said stiffening member is positioned above said plurality of socket members in contact therewith to assist in retaining said socket members in position.

7. The invention of claim 2 further including a vertical partition transversely mounted to said circuit board member rearwardly of said disk module; and at least one additional socket member carried by said vertical partition for receiving the male connector portion of an additional circuit board when installed.

8. The invention of claim 7 further including a retaining panel removably secured to said rear portion of said base member, said retaining panel having at least one forwardly extending biasing nib arranged to engage the rear edge of an additional circuit board when installed in said additional socket member.

9. The invention of claim 2 further including a connector panel secured adjacent the rear portion of said circuit board member, and a plurality of connectors secured to said connector panel.

10. The invention of claim 9 further including a shield panel secured outwardly of said connector panel.

* * * * *